United States Patent [19]

Brown

[11] 3,750,476

[45] Aug. 7, 1973

[54] PRESSURE TRANSDUCER

[75] Inventor: Neil L. Brown, El Cajon, Calif.

[73] Assignee: The Bissett-Berman Corporation, Santa Monica, Calif.

[22] Filed: Sept. 25, 1967

[21] Appl. No.: 670,210

[52] U.S. Cl. .............................. 73/398 C
[51] Int. Cl. .............................. G01l 9/12
[58] Field of Search .............. 73/398 C; 317/246

[56] References Cited
UNITED STATES PATENTS

| | | |
|---|---|---|
| 2,944,199 | 5/1960 | Hudson .............................. 73/398 |
| 2,848,710 | 8/1958 | Owen .............................. 73/398 |
| 3,195,028 | 7/1965 | Werner et al. .............................. 73/398 |
| 3,292,059 | 12/1966 | Woods .............................. 317/246 |
| 3,356,963 | 12/1967 | Buck .............................. 73/398 |
| 3,405,559 | 10/1968 | Moffatt .............................. 73/398 |

Primary Examiner—S. Clement Swisher
Attorney—Smyth, Roston & Pavitt

[57] ABSTRACT

This invention relates to a pressure transducer which is able to operate in all types of environments, including normally adverse environments, to provide an accurate indication of pressure. The pressure transducer is able to provide accurate indications of relatively high pressures in one embodiment and of relatively low pressures in a second embodiment. The pressure transducer provides such accurate indications by varying the distance between two plates of a capacitor in accordance with the variations in the pressure to be measured. The pressure transducer is made by novel methods also included within this invention.

6 Claims, 7 Drawing Figures

INVENTOR:
Neil L. Brown

ATTORNEYS

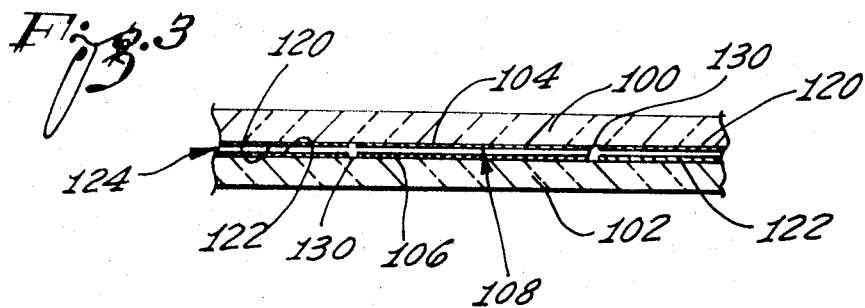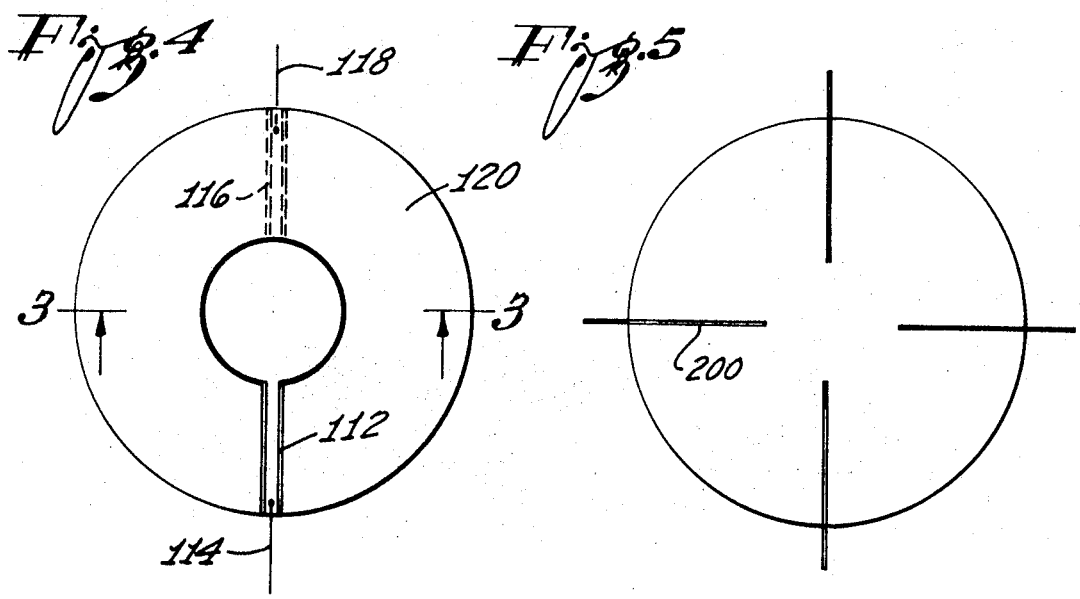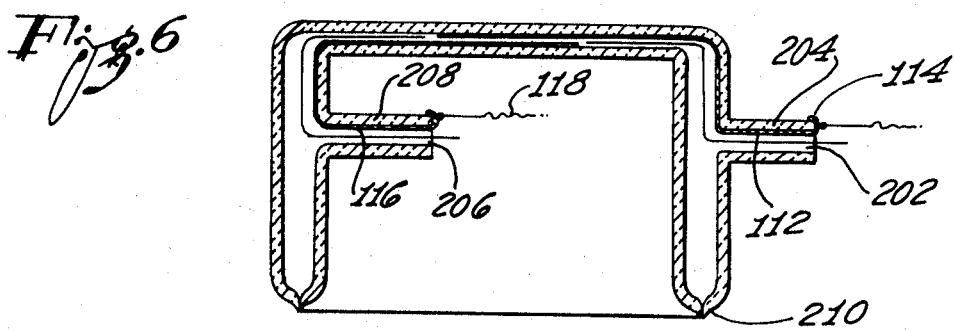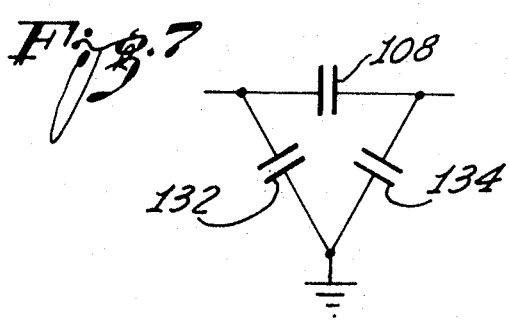

PRESSURE TRANSDUCER

This application relates to pressure transducers and more particularly to transducers which measure pressure by varying the value of a capacitor. The invention also relates to methods of producing such transducers.

As our technology advances, it becomes increasingly important to provide accurate measurements of various parameters such as pressure. These measurements have to be accurate even when extraneous parameter such as temperature are varying considerably. The measurements have to be accurate in various environments such as in air and in liquids. The measurements have to be accurate even in such liquids as sea water where the salinity of the sea water varies at different positions in the water and where the salinity of the sea water tends to corrode the measuring instruments.

Various attempts have been made to provide a pressure transducer which can operate to provide precise measurements of pressure under different conditions. These pressure transducers have not been entirely satisfactory for a number of reasons. One reason has been that the pressure transducers are generally not sealed so that their operating effectiveness becomes impaired when exposed to such adverse environments as sea water. Another reason has been that the pressure transducers do not provide operating characteristics which vary linearly with variations in pressure. A further problem has been that the pressure transducers respond unfavorably to variations in such extraneous parameters as temperature.

This invention provides a pressure transducer which overcomes the disadvantage discussed above. The pressure transducer is made from a pair of members which are sealed to each other so that the operation of the pressure transducer is not adversely effected by such environments such as sea water. The two members are disposed in a particular relationship such as in uniformly spaced contiguity and are coated with an electrically conductive material to define a pair of plates in a capacitor. The distance between the plates is varied in accordance with variations in the pressure imposed upo one of the plates relative to that imposed upon the other plate so that the value of the capacitance defined by the plates also varies linearly. The members may be formed as cylindrical members having a concentric relationship in one embodiment and may be formed as uniformly spaced planar members in a second embodiment.

Preferably the two members discussed in the previous paragraph are formed from quartz since quartz provides certain important advantages. One advantage is that quartz is chemically inert so that it will not corrode in adverse environments such as sea water. Furthermore, since quartz is able to withstand considerable forces in compression, it can be used to measure high pressures in the embodiment in which the two members have a concentric cylindrical relationship. Quartz also exhibits substantially no hysteresis characteristics when subjected to stresses or strains. This causes the operating characteristics of the transducers constituting this invention to remain substantially constant regardless of the stress or strain imposed upon the members unless the stress or strain is of such great magnitude that the quartz becomes fractured. Another advantage is that quartz has a very low temperature coefficient of expansion so that its response to pressure is hardly affected by changes in temperature.

In the embodiment where the two members have a concentric cylindrical relationship relative to each other, the members are not affected to any appreciable extent by any external capacitive fields since the members are self-contained. This is especially true when the external surface of the outer member is coated with a conductive layer of material to serve as an electrical shield. However, in the embodiment where the two members have a planar relationship, novel means are provided for shielding the members capacitively from each other. Novel means are also provided for electrical connections to the conductive coatings on each of the two members to insure that the electrical connections will not affect the value of the capacitor defined by the two coatings. Such novel means will be described subsequently in connection with a detailed description of the invention.

One of the features constituting this invention is the method of making the pressure transducers. This is particularly true with respect to the embodiment where the two quartz members have a substantially planar relationship. In forming this embodiment, wires having a diameter corresponding to the desired spacing between the two quartz members are inserted between the members and the two members are then sealed to each other. The wires are then removed from the space between the two quartz members since the two members are now fixedly disposed relative to each other. The novel method also includes a novel way of making electrical connections to the plates of the capacitor produced between the two quartz members.

IN THE DRAWINGS

FIG. 3 is an enlarged sectional view schematically illustrating certain features included in a second embodiment of the invention, the section being taken substantially on the line 3—3 of FIG. 4;

FIG. 4 is a plan view further illustrating features included in the second embodiment of the invention;

FIG. 5 is a plan view illustrating certain steps in a method of making the embodiment shown in FIGS. 3 and 4;

FIG. 6 is an elevational view, in section, illustrating other steps in the method of making the embodiment shown in FIGS. 3 and 4 and further illustrating other features of the embodiment shown in FIGS. 3 and 4; and FIG. 7 is a schematic diagram illustrating the electrical relationship between different capacitors produced in the embodiment shown in FIGS. 3 and 4.

Figure 1:
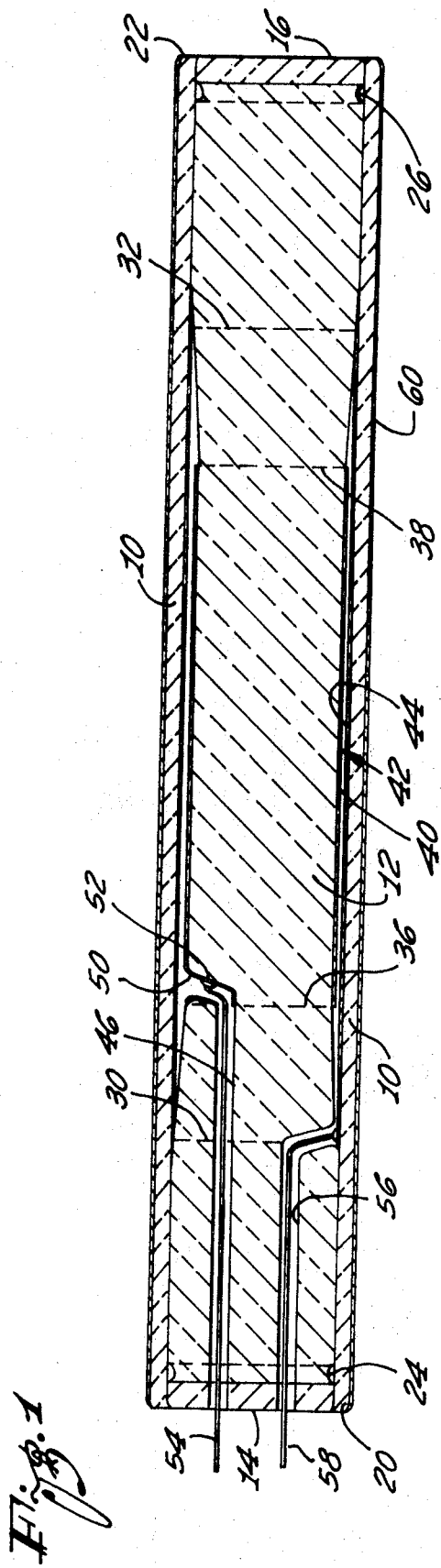
FIG. 1 is a sectional view of one embodiment of a pressure transducer constituting the invention.

In the embodiment of the invention illustrated in FIG. 1, a tube 10 and a rod 12 are preferably provided with a cylindrical configuration and are made from a suitable material such as quartz. Quartz is advantageous for a number of reasons. One reason is that it constitutes an electrical insulator so that it is not affected electrically or chemically by salt and other chemical elements and compounds in adverse environments such as sea water. It is also chemically inert so that it does not corrode in adverse environments such as sea water. Furthermore, quartz constitutes a pure compound from a chemical standpoint so that no chemical or metallurgical variations exist at different positions in the quartz to affect the operating characteristics at such positions.

Quartz is able to withstand a relatively great range of temperatures from low temperatures to high temperatures without being adversely affected in its operating characteristics. It has a relatively low temperature coefficient of expansion such as in the order of 0.5 parts per million per degree centigrade. This prevents changes in ambient temperature from adversely affecting the operating characteristics of the transducer. Quartz is almost elastically perfect so that it exhibits no hysteresis when subjected to stress or strain below the limits where it would fracture. It is also very strong when subjected to compression. This is important in the embodiment shown in FIG. 1 in view of the fact that the force or pressure is imposed in a radial direction against the annular surface of the tube 10.

The external diameter of the rod 12 at the left and right extremities of the rod in FIG. 1 corresponds to the internal diameter of the tube 10 so that the rod 12 fits snugly within the tube 10. The end faces 14 and 16 of the rod 12 are sealed to the tube 10 at the opposite ends or extremities of the tubes by applying heat to the tube 10 at the peripheries indicated at 20 and 22 in FIG. 1. The rod 14 is provided with annular grooves 24 and 26 near its opposite ends to prevent such heat from travelling axially along the tube 10 and the rod 12 to seal the rod to the tube along the annular portion of the rod and tube between the ends 14 and 18. For example, it is undesirable to seal the rod and the tube between the end face 14 and a position 30 indicated by a broken line and between the end face 16 and a position 32 indicated by a broken line.

The rod 12 is progressively tapered between the axial positions 30 and 32. The taper occurs primarily in the area between the axial position 30 and an axial position 36 indicated by a broken line and between the axial position 32 and an axial position 38 indicated by a broken line. Between the axial positions 36 and 38, the rod 12 is provided with a substantially cylindrical configuration and is separated by a relatively small distance such as 0.005 inches from the inner periphery of the tube 10.

The rod 12 is uniformly coated with a thin layer of a conductive material such as platinum in substantially all of its external periphery between the axial positions 36 and 38. The electrical conductive coating 40 constitutes a first plate of a transducing capacitor generally indicated at 42. The second plate of the capacitor 42 is formed by uniformly coating the internal periphery of the tube 10 with a thin layer of the electrically conductive material such as platinum. This coating is provided on substantially the complete internal periphery of the tube 10 between the axial positions 30 and 32 and is indicated at 44. In this way, the coating 44 defines the second plate of the capacitor 42. As will be seen, the coating 44 extends axially beyond the coating 40 in the area between the axial positions 30 and 36 at one end and in the area between the axial positions 38 and 32 at the opposite end. By causing the coating 44 to overlap the coating 40, electrical shielding is provided to insure that the capacitor 42 is not affected in operation by extraneous capacitive or electrical fields.

A bore 46 extends axially through the rod from the end face 14 to a position just beyond the axial position 36. The bore communicates at its internal extremity with the outer periphery of the rod 10. The bore is coated with the conductive material along a wall 50 to communicate with the coating 40, and an electrical connection is made as at 52 between the conductive coating and an electrical lead 54 which extends through the bore 46 to a position external to the pressure transducer. In like manner, a bore 56 is provided in the rod 12 between the end face 14 and a position adjacent to the axial position 30. This bore communicates with the external periphery of the rod 12. An electrical connection is made between the coating 44 on the internal surface of the tube 10 and an electrical lead 58 which extends through the bore 56 to a position external to the pressure transducer.

By way of illustration, the tube 10 may be provided with an axial length of approximately 4.5 inches and with an external diameter of approximately three-quarters of an inch. The thickness of the tube 10 may be approximately 0.06 inches and the distance between the axial positions 30 and 32 may be approximately 3.5 inches. The axial positions 30 and 32 may be equally spaced from the respective ends 18 and 20 of the tube. The rod 12 is also provided with a length in the order of 4.5 inches and is provided with an external diameter in the order of 0.630 inches. The grooves 24 and 26 are provided with a radius in the order of 0.030 inches and are respectively separated from the ends of the rod by a distance in the order of 0.10 inches. The distances between the ends of the rod 12 and the axial positions 36 and 38 are approximately 0.75 inches. The bores 50 and 56 are provided with suitable diameters in the order of 0.060 inches.

The pressure transducer illustrated in FIG. 1 and described above operates to measure pressure by indicating the value of the capacitor 42 formed between the conductive coatings 40 and 44. For example, the pressure transducer may be disposed in sea water to measure the pressure of the sea water. The pressure of the sea water causes forces to be imposed in a radial direction on the transducer so that the portion of tube 10 between the axial positions 30 and 32 is compressed toward the external periphery of the rod 12. The movement of the tube 10 toward the rod 12 in the area between the axial positions 30 and 32 is dependent upon the pressure imposed upon the tube. The value of the capacitor is measured at each instant to indicate the pressure imposed upon the tube. The pressure transducer constituting this invention is advantageous for use in adverse environments such as sea water since the pressure transducer is completely sealed so that the sea water cannot enter into the pressure transducer and affect the operation of the transducer.

The space between the conductive coatings 40 and 44 is preferably a vacuum so that the dielectric constant of the capacitor 42 formed by the conductive coatings 40 and 44 will be substantially uniform and relatively high. However, air or any other gas providing a substantially uniform dielectric can also be disposed between the conductive coatings 40 and 44 without affecting the operation of the pressure transducer. If desired, other dielectric materials than air or gas may also be disposed in the space between the conductive coatings 40 and 44 depending upon the use desired for the pressure transducer.

The embodiment illustrated in FIG. 1 and described above is particularly adapted to be used for measuring relatively high pressures. For example, the pressure transducer is adapted to measure the pressure of sea water at considerable depths below the surface of the water. Even at such relatively high pressures, the pressure transducer is able to respond accurately since the curved configurations of the tube 10 and the rod 12 cause these members to withstand relatively high pressures and to provide linear response characteristics with changes in pressure.

If desired, the outer surface of the tube 10 may be coated with a conductive material such as platinum to serve as an electrical shield for preventing the operation of the capacitor 42 from being affected by external parameters. This conductive coating is illustrated at 60 in FIG. 1. This is not necessary when the pressure transducer is disposed in sea water since the sea water is conductive and serves as an electrical shield. However, it may be desirable to platinize the outer periphery of the tube 10 or to provide an external shield around the tube when the pressure transducer is used in other environments, particularly when the environments are not electrically conductive.

Figure 2:
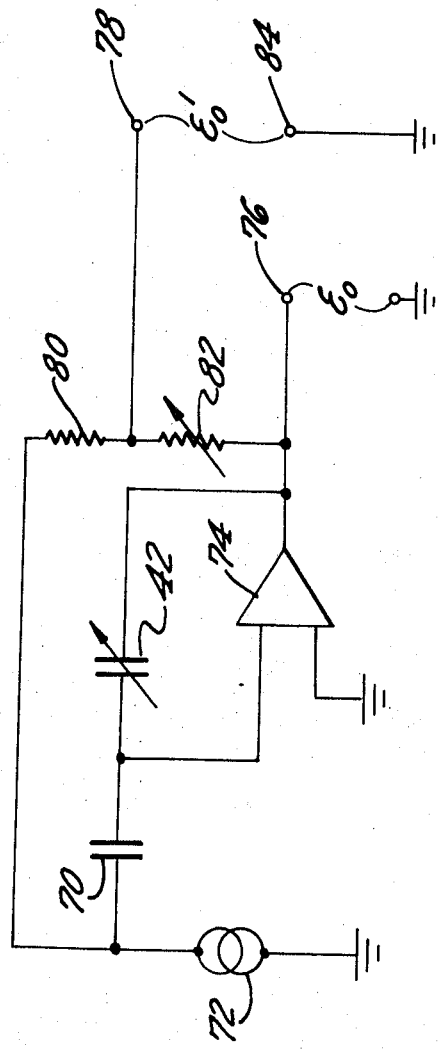
FIG. 2 is a circuit diagram somewhat schematically illustrating a system for measuring the pressure indicated by the transducer shown in FIG. 1.

The transducing capacitor 42 may be included in a circuit illustrated on a schematic basis in FIG. 2. The construction and operation of this circuit are disclosed in detail in copending application Ser. No. 501,731 filed Oct. 22, 1965, by me and assigned of record to the assignee of record of this application. The transducing capacitor 42 is connected to a reference capacitor 70 having a known capacitive value. The terminal of the reference capacitor 70 is connected to a terminal of a source 72 of reference potential, and the common terminal between the capacitors 42 and 70 is connected to an input terminal of an operational amplifier 74. Second terminals of the potential source 72 and the operational amplifier 74 are grounded.

The output terminal of the amplifier 74 is connected to a terminal 76. A terminal 78 is connected to the terminal common to a pair of resistors 80 and 82, the resistor 82 being adjustable in value. The output is obtained between the terminal 78 and a grounded terminal 84. The resistors 80 and 82 are in series with the capacitors 42 and 70 to form an electrical bridge. An input voltage may be considered as being introduced to a first pair of diagonally opposite terminals in the bridge, and an output voltage may be considered as being obtained from a second pair of diagonally opposite terminals in the bridge.

The operational amplifier is provided with a very high impedance and ideally would be provided with an infinite impedance. Because of this, the common terminal between the capacitor 42 and 70 may be considered as grounded. Since both input terminals of the amplifier 74 may then be considered as grounded, the effects of stray capacitances in the circuit shown in FIG. 3 are minimized. This is discussed in detail in copending application Ser. No. 501,731. By minimizing the effects of stray capacitances, the voltage produced between the terminals 78 and 84 provides an accurate indication of the value of the transducing capacitor 42.

Furthermore, at a pressure of 0, a capacitive value would still exist between the conductive coatings 40 and 44 defining the transducing capacitor 42 so that the reactance of the capacitor would be different from 0. The resistors 80 and 82 are included in the circuit shown in FIG. 3 to form a bridge with the capacitors 42 and 70 so that the voltage across the capacitor 42 for a pressure of 0 will be balanced by the operation of the other components in the bridge and a resultant potential of 0 volts will be produced between the terminals 78 and 84 for a pressure of 0.

The value of the transducing capacitor 42 formed between the conductive coatings 40 and 44 may be expressed as:

$$C_S = K_1 1/d, \text{ where} \tag{1}$$

$C_S$ = the value of the capacitor 42;
$K_1$ = a constant
$d$ =d the distance between the conductive coatings 40 and 44.
As is well known, $$X_S = 1/2\pi f\, C_S, \text{ where} \tag{2}$$

$X_S$ = the reactance of the capacitor 42; and
$f$ = the frequency of the signal introduced to the capacitor 42.
Substituting in equation (2) the value of $C_S$ in equation (1):

$$X_S = 1/2\pi f \cdot d/K_1. \tag{3}$$

The ratio between the reactance $X_S$ of the transducing capacitor 42 and the reactance $X_R$ of the reference capacitor 70 may now be expressed as:

$$\frac{X_S}{X_R} = \frac{\frac{d}{2\pi k_1 f}}{\frac{1}{2\pi f C_R}} = \frac{d C_R}{K_1}, \text{ where} \tag{4}$$

$C_R$ = the value of the reference capacitor 70.
Since $C_R$ is a constant, $$X_S X_R = K_2\, d, \text{ where} \tag{5}$$

$K_2$ = a constant.

In this way, the ratio between the reactances of the transducing capacitor 42 and the reference capacitor 70 is linearly related to the distance between the conductive coatings 40 and 44 of the transducing capacitor. Since the distance between the conductive coatings 40 and 44 is linearly related to the pressure imposed upon the tube 10 relative to the pressure on the rod 12, the ratio between the reactances of the transducing capacitor 42 and the reference capacitor 70 is linearly related to such pressure.

The embodiment illustrated in FIGS. 3 and 4 also uses a pair of members 100 and 102 which are preferably formed from quartz. The members 100 and 102 are perferably disposed in a planar configuration and are uniformly spaced from each other in the planar configuration by a relatively small distance such as 0.005 inches. Conductive coatings 104 and 106 are respectively disposed on the contiguous surfaces of the members 100 and 102 to define the plates of a capacitor generally indicated at 108. The conductive coatings 104 and 106 are preferably provided with a configuration such as a circular configuration and are preferably disposed at the central positions of the contiguous surfaces on the members 100 and 102. Preferably the diameter of the coatings 104 and 106 is fairly small relative to the dimensions of the contiguous surfaces on the members 100 and 102. For example, the diameter of the conductive coatings 104 and 106 may be approximately one-third of the total diameter of the contiguous surfaces on the members 100 and 102.

As will be seen in FIG. 4, the conductive plate 104 is provided with a conductive handle 112 which extends in a suitable direction and second as radially from the conductive coating 104 at one end of the coating. An electrical lead 114 is connected to the conductive handle 112 at the outer end of the handle. In like manner, a conductive handle 116 extends radially from the conductive coating 106 in a direction diametrically opposed to the handle 112. An electrical lead 118 is connected to the conductive handle 116 at the outer end of the handle. Since the handles 112 and 116 are diametrically opposed, a minimal capacitive relationship exists between the handles. In this way, the value of the capacitor 108 is affected essentially only by the distance of the conductive coatings 104 and 106 from each other.

A thin conductive coating 120 is disposed on the surface of the member 100 facing the member 102. The conductive coating 120 has essentially a doughnut-shaped configuration which surrounds the conductive coating 104 and the handle 112. The inner periphery of the conductive coating 120 is separated from the outer periphery of the conductive coating 104 and the handle 112 by a relatively small distance. In like manner, a conductive coating 122 having the configuration of the conductive coating 120 is provided on the same surface of the member 102 as the conductive coating 106 and is disposed in contiguous and surrounding relationship to the coating 106 and the handle 116. The conductive coatings 120 and 122 constitute the plates of a shielding capacitor generally indicated at 124.

The pressure transducer shown in FIGS. 3 and 4 is adapted to be used for measuring low pressures. For example, the pressure transducer may be useed in an airplane to measure the pressure of the atmosphere at different elevations so as to indicate on an accurate and sensitive basis the elevation of the airplane above sea level. When the pressure transducer is used to measure low pressures, one of the members 100 and 102 may be disposed in a fixed configuration and the other member may be operated as a diaphragm in accordance with variations in the pressure applied to the member to vary the distance between the members 100 and 102. Since the change in pressure between the members 100 and 102 causes the distance between the conductive plates 104 and 106 to vary, the capacitor 108 formed by the conductive plates 104 and 106 provides a direct indication of the pressure imposed upon one of the members such as the member 100 in accordance with the value of the capacitor at each instant. For example, a change of 15 lbs. per square inch in pressure may produce a change of 0.003 inches between the conductive plates 104 and 106.

The conductive plates 104 and 106 are respectively disposed at the centers of the adjacent surfaces on the members 100 and 102 for several important reasons. One reason is that the movement of the members 100 and 102 relative to each other is greater with changes in pressure at the center of the members than at the periphery of the members. Another reason is that the shielding capacitor 124 can then be disposed around the transducing capacitor 108 to prevent fringe lines of force around the periphery of each of the conductive coatings 104 and 106 from travelling to the other conductive coating. Since such fringe lines do not travel in straight paths, they prevent the value of the capacitor 108 from changing linearly with changes in the pressure imposed upon one of the members 100 and 102. These fringe lines are illustrated in broken lines at 130 in FIG. 3.

The conductive plates 120 and 122 are preferably connected to each other to receive a suitable reference potential such as ground. Since the conductive plates 104 and 120 are disposed in contiguous relationship, a capacitor 132 is produced between these plates. Similarly, a capacitor 134 is produced between the plates 106 and 122. On this basis, a capacitive network similar to that illustrated in FIG. 7 is produced by the arrangement shown in FIGS. 3 and 4. The capacities 132 and 134 in this network do not appreciably affect the measurement of the transducing capacitor 108 since they are connected in substantially symmetrical relationship to the plates of the capacitor 108 and their values are substantially equal and relatively low.

Preferably the capacitive arrangement shown in FIGS. 3 and 4 is disposed within a shield to limit the production of other capacitive effects resulting from fringe lines of force. For example, some capacitive effect would be produced between the handles 112 and 116 if a shield were not disposed around the unit shown in FIG. 3 and 4. Some capacitive effect would also be produced illustratively between the conductive coatings 106 and 120 and between the conductive coatings 104 and 122 if the unit shown in FIGS. 3 and 4 were not disposed within a shield.

The pressure transducer shown in FIGS. 3 and 4 may be made by a method constituting a novel feature of this invention. As illustrated in FIGS. 5 and 6, a plurality of platinum wires 200 may be disposed between the members 100 and 102 to provide the desired spacing between the members. For example, when a spacing of approximately 0.005 inches is desired between the planar surfaces of the members 100 and 102, the platinum wires 200 may be provided with a thickness of approximately 0.005 inches. As illustrated in FIG. 6, the platinum wires may actually be drawn through an opening 202 in a flange 204 on the member 100 and through an opening 206 in a flange 208 on the member 102. The members 100 and 102 may then be fused as at 210 to seal the members and to maintain the desired spacing of 0.005 inches between the members. After the members have been fused, the wires 200 may be withdrawn from the space between the members 100 and 102 without affecting the spaced relationship between the members.

The flanges 202 and 206 also perform another function. As may be seen in FIG. 6, the conductive handle 116 is extended through the bore 206 in the flange 208 to a position external to the flange, and an electrical connection is made at this external position between the extended handle and the electrical lead 118. Similarly, the conductive handle 112 is extended on the member 102 so as to pass through the bore 202 to a position external to the flange 204. The electrical lead 114 is then connected to the extended handle 112 at the external position. In this way, electrical connections can be easily made to the conductive coatings 104 and 106 defining the transducing capacitor 108.

Although this application has been disclosed and illustrated with reference to particular application, the principles involved are susceptible of numerous other applications which will be apparent to persons skilled in the art. This invention is, therefore, to be limited only as indicated by the scope of the appended claims.

What is claimed is:

1. In combination for use in a pressure transducer,
    a hollow tube made from a chemically inert, electrically insulating material having substantially linear stress-strain characteristics and capable of withstanding relatively low and high temperatures and having a relatively low temperature coefficient of expansion and capable of withstanding considerable pressure, the hollow tube having a pair of opposite ends to define a closure;
    a rod made from a chemically inert, electrically insulating material having substantially linear stress-strain characteristics and capable of withstanding relatively low and high temperatures and having a relatively low temperature coefficient of expansion and capable of withstanding considerable pressures, the rod having a pair of opposite ends and a curved external surface between the opposite ends, the curved external surfaces on the rod corresponding to the curved internal surface in the tube;
    the rod being disposed within the tube and being sealed to the tube at the opposite ends, the rod being snugly disposed against the tubes within the opposite ends and being tapered slightly at an intermediate position between the opposite ends relative to the tube to have a slight spacing from the tube;
    the external surface of the rod and the internal surface of the tube being coated with an electrically conductive material at the intermediate positions between the opposite ends to define first and dsecond plates of a capacitor;
    there being a substantially uniform dielectric in the spacing between the tube and the rod; and
    means for providing for an indication of variations in the value of the capacitor in accordance with variations in the spacing between the first ansecond plates.

2. The combination set forth in claim 1 wherein the rod and the tube are made from quartz and are substantially cylindrical.

3. The combination set forth in claim 1 wherein the hollow tube has an external surface which is coated with a conductive material to provide external shielding for the capacitor defined by the hollow tube and the rod.

4. In combination for measuring variations in pressure,
    a first quartz member having a first surface;
    a second quartz member having a second surface;
    first electrically conductive material on the first surface of the first quartz member;
    second electrically conductive material on the second surface of the second quartz member;
    the first and second quartz members being sealed to each other with the first and second surfaces having a particular spacing relative to each other to define plates of a capacitor;
    one of the first and second quartz members being movable relative to the other quartz member in response to variations in pressure to produce a variable value for the capacitor in accordance with such variable pressure;
    first and second electrical leads respectively connected to the first and second electrically conductive material to provide output indications of the variable value of the capacitor;
    an electrical shield enveloping the first and second quartz members; and
    the opposite extremities of the first and second quartz members being fused to produce the seal between the members.

5. In combination for measuring variations in pressure,
    a first quartz member having a particular configuration and defined by at least one extremity and having a first surface in the particular configuration;
    a second quartz member having the particular configuration and defined by at least one extremity and having a second surface in the particular configuration;
    the extremities of the first and second quartz members being sealed to each other with the first surface on the first quartz member and the second surface on the second quartz member in contiguous relationship;
    a first thin electrically conductive coating uniformly disposed on the first surface of the first quartz member;
    a second thin electrically conductive coating uniformly disposed on the second surface of the second quartz member;
    a first electrical lead extending from the first thin electrically conductive coating;
    a second electrical lead extending from the second thin electrically conductive coating;
    an electrical shield being provided for the first and second quartz members; and
    the opposite extremities of the first and second quartz members being fused to provide the seal.

6. In combination for use in a pressure transducer:
    a first member made from a chemically inert, electrically insulating material having substantially linear stress-strain characteristics and capable of withstanding relatively low and high temperatures and having a relatively low temperature coefficient of expansion and capable of withstanding considerable pressures, the first member having a particular configuration and at least one extremity and having a first surface;
    a second member made from a chemically inert, electrically insulating material having substantially linear stress-strain characteristics and capable of withstanding relatively low and high temperatures and having a relatively low temperature coefficient of expansion and capable of withstanding considerable pressures, the second member having the particular configuration and at least one extremity and having a second surface;
    the first and second members being sealed to each other at their extremities with the first and second surfaces being disposed in contiguous and substantially uniformly spaced relationship;

the first and second surfaces being coated with an electrically conductive material to define opposite plates of a capacitor having a value dependent upon the spacing between the first and second surfaces;

first and second leads respectively connected to and extending from the electrical coatings on the first and second surfaces;

an electrical shield enveloping the first and second members; and the extremities of the first and second members being fused to define the shields.

* * * * *